(12) United States Patent
Mezzalira et al.

(10) Patent No.: US 10,359,130 B2
(45) Date of Patent: Jul. 23, 2019

(54) EXTENSIBLE FLEXIBLE HOSE, AND METHOD AND PRODUCTION LINE FOR CONTINUOUSLY MANUFACTURING THEREOF

(71) Applicant: FITT S.P.A., Sandrigo (VI) (IT)

(72) Inventors: Alessandro Mezzalira, Sandrigo (IT); Valentino Vigolo, Caldogno (IT); Luca Battaglia, Bassano del Grappa (IT); Andrea Petronilli, Carmignano di Brenta (IT)

(*) Notice: Subject to any disclaimer, the term of this patent is extended or adjusted under 35 U.S.C. 154(b) by 9 days.

(21) Appl. No.: 15/525,707

(22) PCT Filed: Dec. 18, 2015

(86) PCT No.: PCT/IB2015/059765
§ 371 (c)(1),
(2) Date: May 10, 2017

(87) PCT Pub. No.: WO2016/098063
PCT Pub. Date: Jun. 23, 2016

(65) Prior Publication Data
US 2018/0299038 A1 Oct. 18, 2018

(30) Foreign Application Priority Data

Dec. 18, 2014 (IT) .............................. VI2014A0319
Dec. 18, 2014 (IT) .............................. VI2014A0320

(51) Int. Cl.
*F16L 11/08* (2006.01)
*B29C 48/10* (2019.01)
(Continued)

(52) U.S. Cl.
CPC .......... *F16L 11/08* (2013.01); *B29C 48/0016* (2019.02); *B29C 48/0018* (2019.02);
(Continued)

(58) Field of Classification Search
CPC ........... F16L 11/12; F16L 11/20; F16L 11/085
(Continued)

(56) References Cited

U.S. PATENT DOCUMENTS 3,028,290 A 4/1962 Roberts
3,988,188 A * 10/1976 Johansen .............. B29C 47/023
156/143

(Continued)

FOREIGN PATENT DOCUMENTS

EP 0118613 9/1984
EP 2233812 9/2010
(Continued)

OTHER PUBLICATIONS

Nilflex—PP—Taro Plast S.p. A. (Retrieved from www.materialdatacenter.com).
(Continued)

*Primary Examiner* — Patrick F Brinson
(74) *Attorney, Agent, or Firm* — Themis Law

(57) ABSTRACT

A hose that includes an inner layer and an outer layer made of an elastic polymeric material, and a textile reinforcement layer interposed between the inner and the outer layers. The inner layer and the outer layer are reciprocally coupled to form a unitary tubular member, within which the textile reinforcement layer is embedded. The unitary tubular member has an elasticity such to automatically elongate under the working pressure given by the liquid flowing therethrough to increase its original length and to automatically recover once the working pressure stops. The textile reinforcement layer is adapted to move from a rest configuration when the working pressure stops to a working configuration when the unitary tubular member elongates under the working pressure, and vice versa.

10 Claims, 4 Drawing Sheets

(51) Int. Cl.
| | |
|---|---|
| B29C 48/00 | (2019.01) |
| B29C 48/21 | (2019.01) |
| B29C 48/151 | (2019.01) |
| B29C 48/355 | (2019.01) |
| B32B 27/12 | (2006.01) |
| B32B 27/32 | (2006.01) |
| B29C 55/22 | (2006.01) |
| F16L 11/12 | (2006.01) |
| B32B 5/02 | (2006.01) |
| B32B 5/06 | (2006.01) |
| B32B 5/26 | (2006.01) |
| B32B 25/10 | (2006.01) |
| B32B 27/28 | (2006.01) |
| B32B 1/08 | (2006.01) |
| B32B 25/14 | (2006.01) |
| B29D 23/00 | (2006.01) |
| B29L 23/00 | (2006.01) |
| B29K 25/00 | (2006.01) |
| B29K 667/00 | (2006.01) |
| B29C 48/09 | (2019.01) |

(52) U.S. Cl.
CPC ............ *B29C 48/10* (2019.02); *B29C 48/151* (2019.02); *B29C 48/21* (2019.02); *B29C 48/355* (2019.02); *B29C 55/22* (2013.01); *B32B 1/08* (2013.01); *B32B 5/024* (2013.01); *B32B 5/026* (2013.01); *B32B 5/06* (2013.01); *B32B 5/26* (2013.01); *B32B 25/10* (2013.01); *B32B 25/14* (2013.01); *B32B 27/12* (2013.01); *B32B 27/28* (2013.01); *B32B 27/32* (2013.01); *F16L 11/088* (2013.01); *F16L 11/12* (2013.01); *B29C 48/09* (2019.02); *B29D 23/00* (2013.01); *B29K 2025/06* (2013.01); *B29K 2667/003* (2013.01); *B29K 2995/007* (2013.01); *B29L 2023/005* (2013.01); *B32B 2260/021* (2013.01); *B32B 2260/046* (2013.01); *B32B 2262/0223* (2013.01); *B32B 2262/0261* (2013.01); *B32B 2262/0269* (2013.01); *B32B 2262/0276* (2013.01); *B32B 2262/0284* (2013.01); *B32B 2274/00* (2013.01); *B32B 2307/51* (2013.01); *B32B 2307/536* (2013.01); *B32B 2307/54* (2013.01); *B32B 2307/546* (2013.01); *B32B 2307/558* (2013.01); *B32B 2307/718* (2013.01); *B32B 2307/732* (2013.01); *B32B 2410/00* (2013.01); *B32B 2597/00* (2013.01)

(58) Field of Classification Search
USPC .................................................. 138/118, 109
See application file for complete search history.

(56) References Cited

U.S. PATENT DOCUMENTS

| | | | | |
|---|---|---|---|---|
| 4,009,734 | A * | 3/1977 | Sullivan | B29C 53/12 138/118 |
| 4,228,824 | A * | 10/1980 | Evans | A01G 25/00 138/119 |
| 4,478,661 | A * | 10/1984 | Lewis | B29C 53/48 156/92 |
| 6,523,539 | B2 * | 2/2003 | McDonald | A62B 7/14 128/205.25 |
| 9,127,791 | B2 * | 9/2015 | Ragner | F16L 11/118 |
| 2010/0108239 | A1 | 5/2010 | Recker et al. | |
| 2012/0118998 | A1 | 5/2012 | Drechsel | |
| 2012/0213958 | A1 | 8/2012 | Golub et al. | |
| 2012/0234425 | A1 * | 9/2012 | Berardi | F16L 11/12 138/137 |
| 2015/0061281 | A1 | 3/2015 | Huang | |
| 2015/0152984 | A1 * | 6/2015 | Disbrow | F16L 11/085 138/119 |
| 2016/0146379 | A1 | 5/2016 | LaTulippe et al. | |

FOREIGN PATENT DOCUMENTS

| | | |
|---|---|---|
| EP | 2778491 | 9/2014 |
| GB | 740458 | 11/1955 |
| JP | S5073919 | 6/1975 |
| JP | H0942545 | 2/1997 |
| JP | 2006207648 | 8/2006 |
| JP | 2007071385 | 3/2007 |
| JP | 201512881 | 1/2015 |
| WO | 9737829 | 10/1997 |
| WO | 0077433 | 12/2000 |
| WO | 2011161576 | 12/2011 |
| WO | 2012014122 | 2/2012 |
| WO | 2015177664 | 11/2015 |

OTHER PUBLICATIONS

Covestro Deutschland AG, Texin(R) RxT70A.
BASF Polyurethanes GMBH, Elastollan(R) soft 35AP.
SHORE-Härte (Retrieved from wiki.polymerservice-merseburg. de).

* cited by examiner

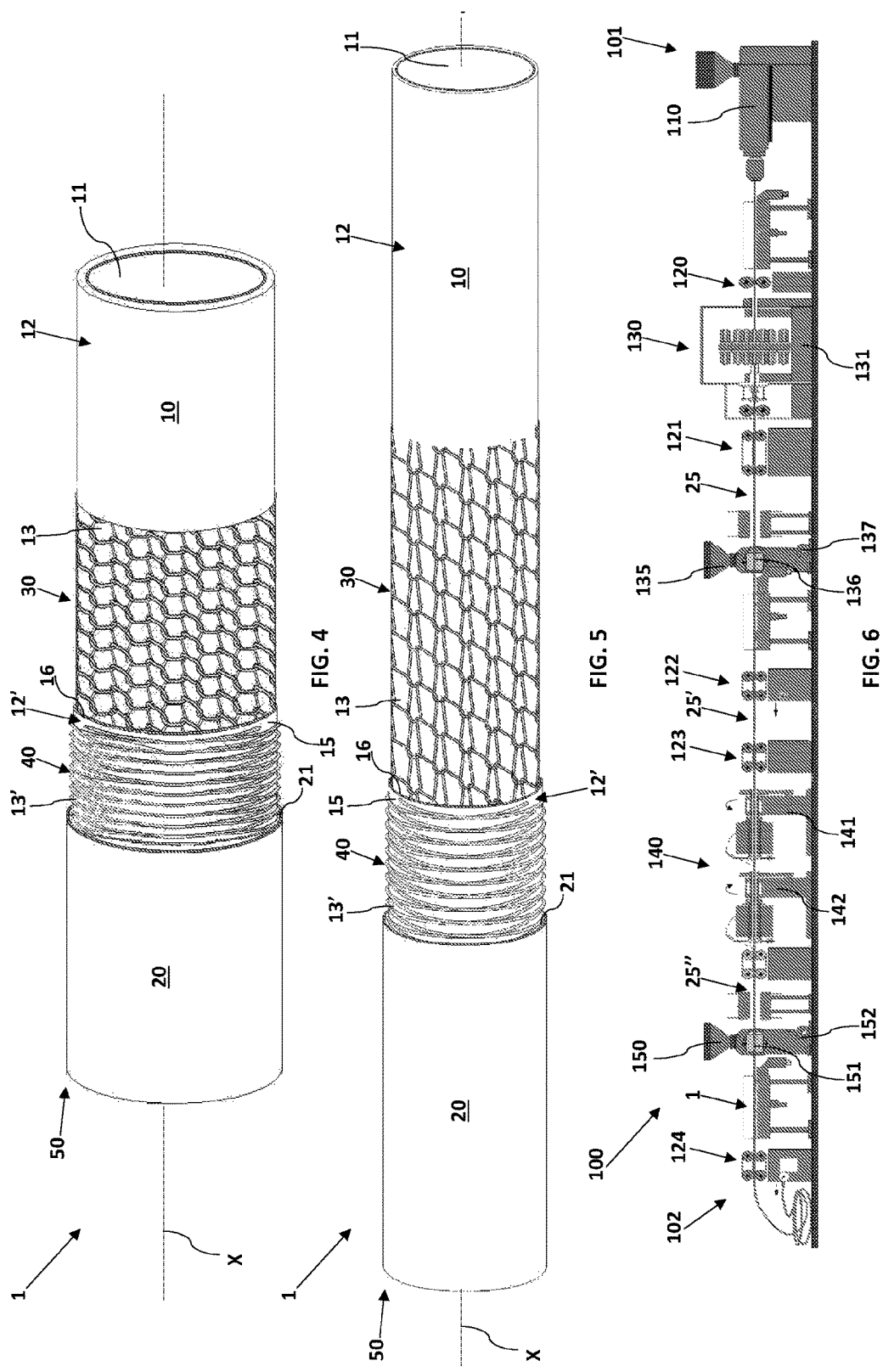

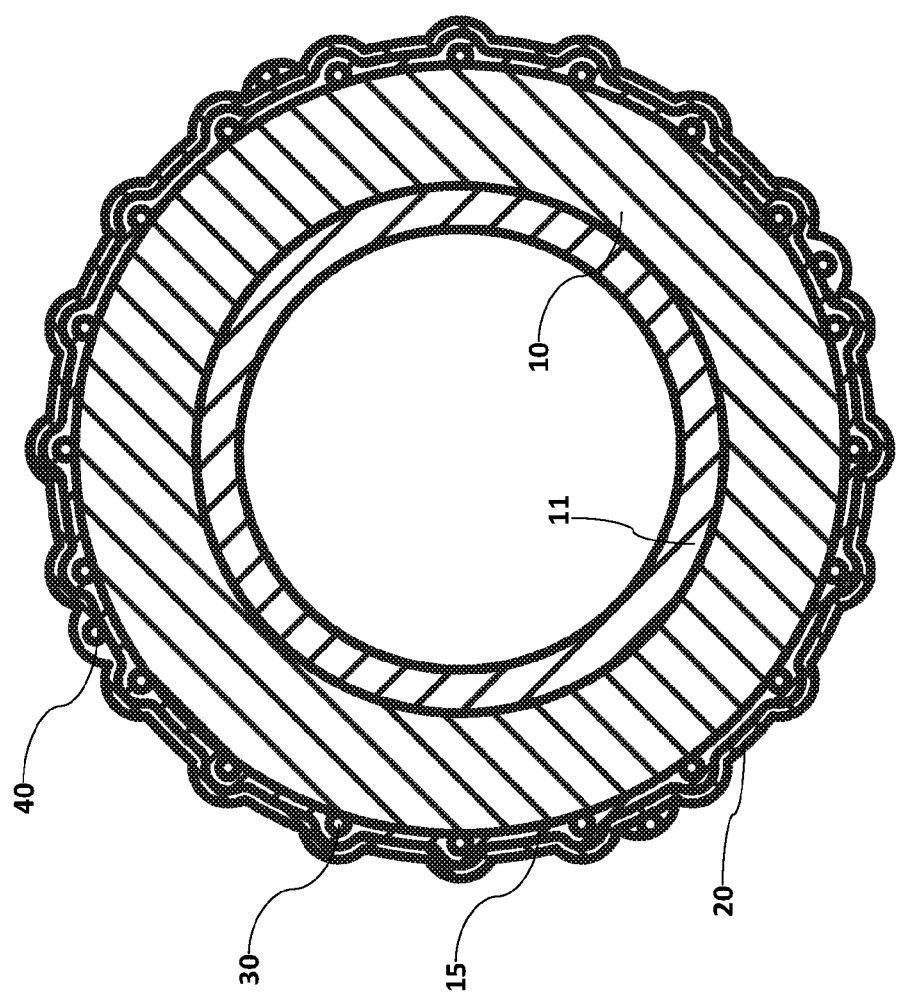

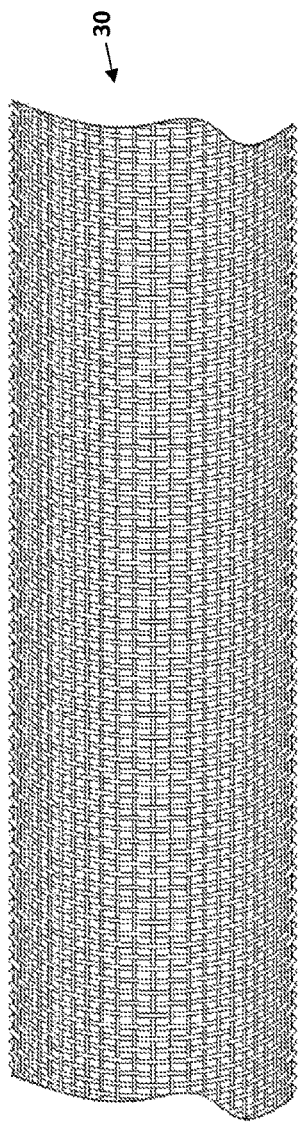
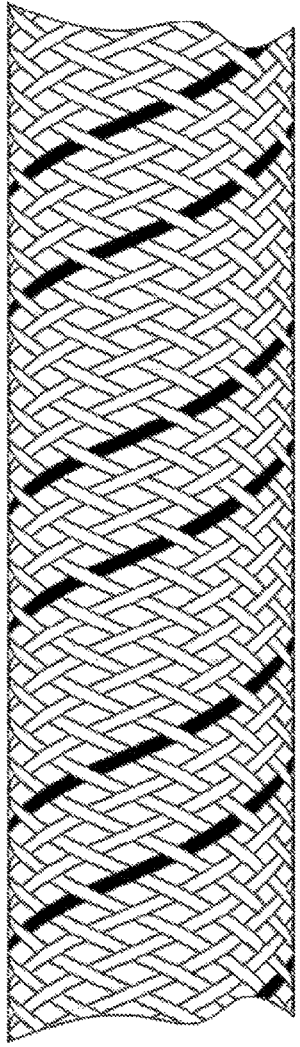
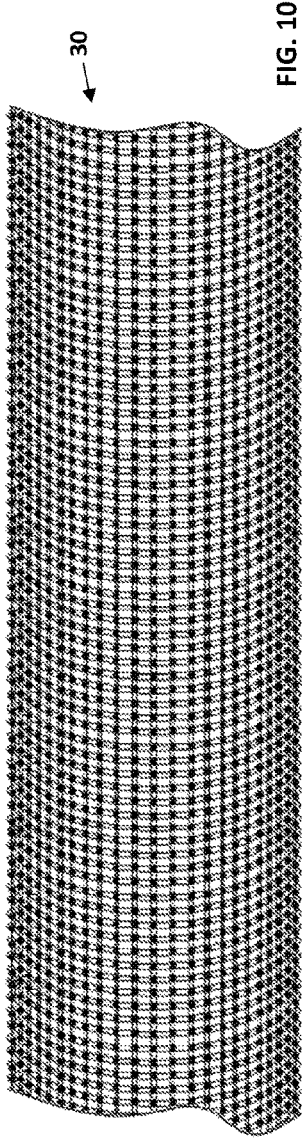
FIG. 8
FIG. 9
FIG. 10

EXTENSIBLE FLEXIBLE HOSE, AND METHOD AND PRODUCTION LINE FOR CONTINUOUSLY MANUFACTURING THEREOF

FIELD OF THE INVENTION

The present invention is generally applicable to the technical field of flexible hoses, and particularly relates to a flexible hose, preferably an irrigation hose or garden hose for transporting water, which is extensible, i. e. susceptible to automatically elongate upon the passage of the fluid inside it and to automatically retract when the pressure of the liquid stops.

The invention further relates to a method and a production line for manufacturing such flexible extensible hose.

DEFINITIONS

As used herein, with the expression "textile reinforcement layer" or derivative thereof is meant a layer consisting of at least one textile yarn arranged on a layer that supports it. The "textile reinforcement layer" is disposed on the supporting layer so as to leave free portions thereof, generally square-, rectangular- or rhomboid-shaped.

As used herein, with the expression "textile yarn" or derivative thereof includes an elongated thread-like member of any shape and made of any material, provided that the magnitude of the length is significantly prevailing over the other. For example, the textile yarn may be a polymer yarn, which may have a unitary structure or may in turn consist of the union of several elementary threads, or a textile band having rectangular section.

As used herein, with the expression "spiral textile layer" or "spiraling" or derivative thereof is meant a layer consisting of a single yarn wound as a spiral on the supporting layer with a predetermined pitch or groups of yarns wound as a spiral on the supporting layer non overlapping to each other.

As used herein, with the expression "textile braided layer" or "braiding" or derivative thereof is meant a layer consisting of at least two yarns or groups of yarns wound as a spiral on the supporting layer with opposite inclinations and overlapping but not connected to each other. Therefore, a braiding consists of two or more overlapping spirals.

As used herein, with the expression "textile knitted layer" or "knitting" or thereof is meant a layer consisting of at least two yarns or groups of yarns laying on the supporting layer and connected to each other to form a plurality of chain-like knit, also known as "tricot"-type chain knit.

As used herein, with the expression "textile woven layer" or "weaving" or derivative thereof is meant a layer consisting of at least two yarns or groups of yarns laying on a supporting layer with opposite inclinations and connected to one another alternately to form a weave. In a weaving a yarn is interlaced with another yarn once above and then below the latter. Depending on the inclination, the weaving is also known as fabric.

As used herein, with the expression "textile knotted layer" or "knotting" or derivative thereof is meant a layer consisting of at least two yarns or groups of yarns laying on the supporting layer with opposite inclinations and interconnected to each other by means of one or more knots. In a knotting a yarn cannot slide with respect to another due to the constraint imposed by the knots.

As used herein, with the expression "compatible materials" or derivative thereof materials are meant having chemical and/or physical compatibility to each other, that is materials which once coupled give rise to a junction adapted to support the transfer of tensile or shear stresses through the contact surface. Therefore, identical materials or in any case materials having the matrix with the same base have the maximum compatibility.

As used herein, with the expression "matrix" of a polymer or derivative thereof is meant a polymeric material capable of providing the molecular structure of the finished product.

As used herein, with the expression "providing" or derivative thereof is meant the preparation of an element of interest to a process step of interest, thus including any preventive treatment act for the optimum exploiting of the same step of interest, from the simple withdrawal and possible storage to pre-heat and/or chemical and/or physical treatments and the like.

As used herein, with the expression "film" or derivative thereof is meant a layer of polymeric material whose thickness is less than 0.5 mm.

STATE OF THE ART

Extensible flexible hoses for transporting liquids, such as irrigation water, are known susceptible to automatically elongate upon the passage of the fluid inside it and to automatically retract when the pressure of the liquid stops.

The working pressure of the transported liquid causes an elongation with respect to its original length and a more or less apparent increase of the original diameter, so that the flexible hose is susceptible to transport the liquid at a greater distance with respect to its length when not in use.

In a per se known manner, the automatic elongation is due to a restriction inside the hose or connected therewith, for example internal to a connector or to a diffuser or an irrigation lance.

The restriction creates a pressure drop such that the pressure upstream of the restriction acts inside the tube, thus elongating and enlarging it.

For example, from US2003/098084 it is known an irrigation hose having an inner layer, an outer layer and a coil integrated therebetween. Under the pressure of the transported liquid the spiral is automatically extended, allowing the tube to elongate. Once the pressure of the liquid stops, the spiral automatically retracts, allowing the tube to resume its original length.

Apparently, this hose is difficult to manufacture, due to the presence of the coil. Furthermore, it is cumbersome and impractical to use. For example, it is difficult if not impossible to roll up the hose on a hose reel.

Another drawback of such a hose is that the burst pressure is relatively low. In fact, the resistance to the burst is exclusively imparted by the inner and outer polymeric layers.

From document EP2520840 it is known a further extensible irrigation hose consisting of an inner elastic tube and a rigid outer fabric. Under the pressure of the transported liquid the inner tube elongates and enlarges its diameter up to a maximum length and a maximum diameter determined by the outer fabric. When the liquid pressure stops, the inner tube retracts, and the outer fabric lies in an undulated manner on the inner tube.

An apparent drawback of this hose is that it is difficult and expensive to manufacture. In fact, for each hose it is necessary to separately produce the inner tube and the outer fabric, then insert the first through the latter and then connect each other the tube and the fabric through end fittings.

These operations are very difficult to perform in a continuous manner, and practically impossible to carry out in line, that is, by means of a single automatic production line. In fact, in order to manufacture such a hose, the use of human operators is needed.

Moreover, the presence of the fabric renders the hose bulky and unwieldy to use and store. For example, this tube is very difficult to store on a classic hose reel since the fabric occupies a relatively high space, much greater than the actual volume of the inner tube.

Further, the burst pressure is extremely low, because in practice only determined by the inner tube.

In addition, in case of breakage of the inner tube such a hose is impossible to repair, and must be replaced with a new one.

For the same reason, it is not possible to customize the length of the tube, for example to obtain two hoses from a single longer hose.

Another known drawback of this known hose is that it must necessarily include the end fittings, since the outer fabric and the inner tube are elements independent of one another. Therefore, in case of breakage or simple damage to the original fittings the hose must be replaced with a new one.

This further limits the user's freedom in customizing the hose, since the original fittings cannot be replaced.

Further, the outer fabric tends to become dirty, making the use of such a hose very cumbersome and difficult. In fact, the textile fabric when dragged on a wet ground tends to collect mud and/or dirt and to get heavy. Moreover, the sludge once hardened adheres firmly to the fabric, thus increasing the difficulty of use and of storage of this known hose.

Other documents belonging to the state of the art of the present invention are: U.S. Pat. No. 3,028,290, EP2778491, U.S. Pat. No. 4,009,734, WO2011/161576, WO00/77433, WO97/37829, GB740458, GB1481227, US2003/062114, WO2015/177664, US2014/130930, US2013/087205, FR2784447 and WO2013/105853.

SUMMARY OF THE INVENTION

Object of the present invention is to overcome at least partially the above drawbacks, by providing an extensible flexible hose of remarkable efficiency and relative cheapness.

Another object of the invention is to provide an extensible flexible hose which can be manufactured in a simple and fast manner.

Another object of the invention is to provide an extensible flexible hose which can be manufactured automatically in line.

Another object of the invention is to provide an extensible flexible hose which is wieldy to use.

Another object of the invention is to provide an extensible flexible hose which is simple to clean from any residual dirt and/or mud due to dragging on wet soils.

Another object of the invention is to provide an extensible flexible hose which has a relatively high burst pressure.

Another object of the invention is to provide an extensible flexible hose that has minimum bulkiness.

Another object of the invention is to provide an extensible flexible hose which is simple and practical to be stored.

Another object of the invention is to provide an extensible flexible hose that can be repaired in case of breakage.

Another object of the invention is to provide an extensible flexible hose that can be customized in length.

This and other objects are achieved by a flexible hose for transporting liquids, particularly an irrigation hose or garden hose for the transport of water, and by a method and a line for manufacturing thereof, according to which is herein described, shown and/or claimed.

The hose has a non-corrugated, non-coiled tubular structure, typical of the irrigation hoses or garden hoses. The polymeric layers may be tubular shaped.

An example of a corrugated hose is known from document U.S. Pat. No. 3,028,290, whereas an example of a coiled hose is known from document U.S. Pat. No. 4,009,734.

The flexible hose may comprise at least one inner layer of a first polymeric elastic material, at least an outer layer of a second polymeric elastic material and at least one textile reinforcement layer interposed therebetween.

The at least one inner layer and at least one outer layer may be joined together to form a unitary tubular member that integrates, that is embed, the at least one textile layer.

To do this, the at least one outer layer and the at least one inner layer may be reciprocally joined in correspondence of the areas of the outer surface of the at least one inner layer not covered by the at least one textile reinforcement layer. In other words, the at least one outer layer and the at least one inner layer may be reciprocally joined except at the regions occupied by the textile yarns of the at least one textile layer.

Suitably, the unitary tubular member may have an elasticity such as to automatically elongate and enlarge under the pressure imparted by the working fluid that flows therethrough to increase its original length and such as to retract automatically once the working pressure stops to return to the original length and diameter.

The elongation is apparent and appreciable at sight, whereas the enlargement is less apparent and eventually not appreciable at sight.

To do this, the first and the second polymeric elastic material forming the unitary tubular member are to be suitably chosen.

The first and the second polymeric materials may be elastomers or thermoplastic elastomers (TPE).

Suitable TPEs may be TPE-S, such as PP/SEBS or PP/EPDM, or TPE-O, such as Ethylene-Octene copolymer.

Suitable elastomers may be natural rubber or latex.

Suitably, the unitary tubular member may have a Shore A hardness measured according to ASTM D2240 (3") of 30 ShA to 50 ShA.

The textile yarns of the at least one textile layer may be polyester, nylon 6,6, polyvinyl alcohol, para-aramid fibers, meta-aramid fibers, Rayon®.

Advantageously, the textile yarns of the at least one textile layer may have an elongation at break measured according to BISFA (Chap 7) less than 30%, and preferably less than 25%.

Advantageously, the textile yarns of the at least one textile layer may have a toughness as measured according to BISFA (Chap 7) of at least 50 cN/tex.

In a per se known manner, the automatic elongation and enlargement is promoted by one or more restrictions or flow restrictors inserted in the hose or connected therewith, as taught by the documents EP2520840 and/or EP2778491, which are referred to for proper consultation. Suitably, one of the ends of the hose may be connected to means for supplying the liquid to be transported, for example a faucet.

As known, a textile reinforcement layer in a flexible hose if stressed tends to elongate axially and to enlarge radially, depending on the type.

Advantageously, the at least one textile reinforcement layer of the extensible hose of the present invention may be susceptible to move between a rest configuration that has at rest, i.e. when the liquid does not flow through the unitary tubular member, and a working configuration that has when the unitary tubular member is actuated by the working pressure of the liquid flowing therethrough.

In the working configuration the at least one textile reinforcement layer extends axially and expands radially to accompany the elongation and enlargement of the unitary tubular member.

Depending on whether the yarns of the textile reinforcement layer are elastic or rigid, such elongation and enlargement is more or less marked.

However, the yarns of the textile reinforcement layer may preferably be rigid, so as to effectively act on the unitary tubular member upon the elongation thereof.

Preferably, the at least one textile reinforcement layer and the unitary tubular member may be mutually configured so that the former intercepts the latter upon its elongation and enlargement in order to determine the maximum length and diameter.

In other words, for a given inner hose pressure the maximum axial elongation and radial enlargement of the at least one textile reinforcement layer is lower than the maximum axial elongation and radial enlargement of the unitary tubular member, so that the maximum axial elongation and radial enlargement of the at least one textile reinforcement layer determines the axial maximum elongation and radial enlargement of the whole hose.

Suitably, the automatic retraction of the unitary tubular member allows the at least one textile reinforcement layer to return to the rest configuration once the pressure inside the hose stops.

This automatic retraction of the unitary tubular member can only be accomplished by its elasticity, without any other help. In particular, the hose of the invention may be free of coil springs or similar automatic retraction means.

Thanks to one or more of the above features, it is possible to obtain a flexible extendable hose wieldy and practical to use.

The flexible hose according to the present invention allows to combine all the advantages of an extendable hose with those of a "classic" flexible hose, without all the drawbacks of the extension hoses of the prior art.

In fact, the flexible hose according to the present invention has a relatively high burst pressure, absolutely comparable to that of the "classical" flexible hoses.

In fact, the at least one textile reinforcement layer ensures high burst pressure, and therefore greater durability of the hose.

Moreover, thanks to the fact that the at least one outer layer is of polymeric material, the flexible hose is simple and quick to clean from any residual dirt and/or mud due to dragging on wet soils.

Further, the overall bulkiness of the flexible hose according to the present invention is minimal. This allows for example to store it in a very small space. It is moreover easily storable on a classic hose reel.

In addition, the flexible hose according to the present invention in case of breakage or damage can be restored as a "classic" hose. It is also possible to replace the original fittings, if any, using the classic fittings for flexible hoses on the market, for example in case to rupture of one thereof.

It is however understood that in the hose of the present invention fittings or any element for connecting the ends are not needed to connect each other the various layers. In fact, in the hose of the present invention all the elements are integrated, and in particular the at least one textile reinforcement layer is integrated trough the unitary tubular member.

It is further possible to cut the hose of the present invention to any size while maintaining the features of the whole structure. This makes further possible the customized per meter commercialization thereof.

As mentioned above, the action of the internal pressure to the hose may not only tend to axially elongate it, but also to radially enlarge it.

In this case, the unitary tubular member has its original diameter when the at least one textile reinforcement layer is in the rest configuration and an enlarged diameter when the at least one textile reinforcement layer is in the working configuration.

Preferably, the flexible hose according to the present invention may comprise at least one first textile layer and at least one second textile layer, overlapping each other but not necessarily in mutual contact.

The at least one first textile layer and the unitary tubular member may be mutually configured so that the former intercepts the latter upon its elongation so as to determine the maximum length, whereas the at least one second textile layer and the unitary tubular member may be mutually configured so that the former intercepts the latter upon its enlargement in order to determine the maximum diameter.

The hose can be manufactured by a method which may include in sequence the following steps: a) providing the at least one inner layer; b) making on the at least one inner layer the at least one textile reinforcement layer to obtain a semifinished product; and c) extruding the at least one outer layer on the semifinished product.

Conveniently, the step c) of extruding the at least one outer layer may include a bonding step of the latter and of the at least one inner layer to form the unitary tubular member, so that the at least one textile layer is embedded therein.

Advantageously, the first and the second polymeric elastic material may be mutually compatible, so that the bonding between the at least one inner layer and the at least one outer layer takes place upon the step c) of extrusion of the at least one outer layer.

Preferably, the steps b) of making the at least one textile reinforcement layer and c) extruding the at least one outer layer may be carried out with the at least one inner layer elongated with respect to its original length.

In a preferred embodiment of the invention, the step of elongation of the at least one inner layer may be carried out by drawing the same, preferably by two or more pairs of faced rotating rollers which press the hose.

A first pair of rollers can press the hose prior to the step b) of making the at least one textile reinforcement layer, whereas a second pair can press the hose after the step c) of extrusion of the at least one outer layer. Advantageously, the second pair of rollers may rotate faster than the first pair of rollers.

To allow an easier detachment of the inner layer once pressed by the above rollers, the at least one inner layer may include internally a detaching film.

Thanks to one or more of the above features, the above extendable hose can be manufactured in a simple and fast manner.

In fact, the extensible hose can be manufactured automatically in line, without the aid of human operators.

Advantageous embodiments of the invention are described in the dependent claims.

BRIEF DESCRIPTION OF THE DRAWINGS

Further features and advantages of the invention will be apparent upon reading the detailed description of a preferred, non-exclusive embodiment of an extensible flexible hose 1 and a line 100 for manufacturing thereof, which are described as non limiting examples with the help of the annexed drawings, in which:

FIG. 4 is a schematic side view of an embodiment of the hose 1 at rest;

FIG. 5 is a schematic side view of the embodiment of the hose 1 of FIG. 4 under pressure;

FIG. 6 is a schematic side view of an embodiment of the line 100;

FIG. 7 is a radial sectional view of the embodiment of the hose 1 of FIG. 4;

FIGS. 8 and 9 show two examples of woven textile reinforcement layer;

FIG. 10 shows an example of a knotted textile reinforcement layer.

DETAILED DESCRIPTION OF SOME PREFERRED EMBODIMENT

Figure 1:
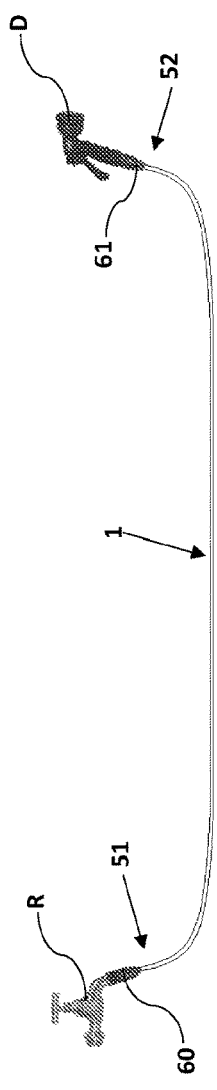
FIGS. 1 to 3 are schematic view of an embodiment of the hose 1 during use.

With reference to the above figures, the extensible hose 1 is advantageously used for the transport of liquids. In particular, the flexible hose 1 may be a irrigation hose or garden hose for the transport of water.

As particularly shown in FIGS. 4, 5 and 7, the extensible hose 1 may include an inner polymer layer 10 and an outer polymer layer 20.

Internally to the inner layer 10, a detaching film 11 may be provided susceptible to come in contact with the liquid to be transported, the function of which will be clear later.

The extensible flexible hose 1 may further include a first inner knitted textile layer 30 with a tricot-type chain knits and a second braided textile layer 40, mutually overlapping. The pitch of the spirals of the second braiding textile layer 40 may be relatively short, for example of 1 mm to 3 mm.

The extensible flexible hose 1 may further include one intermediate polymeric layer 15 interposed between the textile reinforcement layers 30 and 40 for the separation thereof.

It is understood that although in the follow there is described a flexible hose 1 with the above structure, the hose according to the invention may include a minimum of three layers, according to which is defined by the appended claims.

For example, a single textile reinforcement layer may be provided, or one or more further polymeric layers internally or externally to the above layers.

It is further understood that although in the follow a flexible hose 1 with the above structure is described, the technical features here described are applicable to a hose which includes at least three layers, according to which is defined by the appended claims.

It is further understood that although hereinafter reference is made to a garden hose for the transport of water, the extensible flexible hose 1 can have any destination and can transport any liquid, according to which is defined by the appended claims.

In a preferred but not exclusive embodiment, inner layer 10, intermediate layer 15 and outer layer 20 may be made of a styrene-based thermoplastic elastomer (TPE-S) having a matrix based on polypropylene (PP), for example the Nilflex® SH (Taro Plast SpA), having a Shore A hardness measured according to ASTM D2240 (3") of 40. Such a material has a tensile strength measured according to ASTM D412/C of about 6.5 MPa and an elongation at break measured according to ASTM D412/C of approximately 880%.

Indicatively, the inner layer 10 may have a thickness of 1.5 mm to 2.5 mm, preferably 1.6 mm-2 mm. On the other side, the film 11 may have a thickness of 0.05 mm to 0.4 mm, preferably 0.1 mm-0.3 mm.

Preferably, the detaching film 11 also may be made of the same material described above, to which may be added a small percentage of lubricant-release additive agent.

For example, the material may be added about 1% by weight total of CRODAMIDE® (CRODA Polymer Additives), a migrant agent who has the aim to decrease friction and blocking of the material on itself.

In a preferred but not exclusive embodiment, the textile reinforcement layers 30 and 40 may be made of polyester (PET)-based yarns, for example the Brilen GLE® (Brilen Tech SA) having a linear density of 550 dtex. Such yarns have an ultimate tensile strength, measured according to BISFA (Chap 7) of 42,7+/−4,2 N, an elongation at break measured according to BISFA (Chap 7) of 12,5+/−2,5% and toughness measured according BISFA (Chap 7) of 75,5+/−7 cN/tex.

The first textile reinforcement layer 30 may be placed on the outer surface 12 of the inner layer 10 so as to leave thereon a plurality of open areas 13, which are directly facing to the corresponding portions of the inner surface 16 of the intermediate layer 15.

On the other hand, the second textile reinforcement layer 40 may be placed on the outer surface 12' of the intermediate layer 15 so as to leave thereon a plurality of open areas 13', which are directly facing to the corresponding portions of the inner surface 21 of the outer layer 20.

Suitably, the inner layer 10, intermediate layer 15 and outer layer 20 may be reciprocally bonded in correspondence with the respective uncovered areas 13, 13'.

The bond between the inner layer 10, intermediate layer 15 and outer layer 20 may be assured by the use of materials compatible with each other or by a layer of adhesive material interposed between them.

To effect such a coupling, the inner layer 10, intermediate layer 15 and outer layer 20 form a unitary tubular member 50, inside of which the reinforcing textile layers 30 and 40 may be integrated or embedded.

The possible choice of the same material for all the polymeric layers of the hose makes homogeneous the mechanical behavior of the unitary tubular member 50, and ensures maximum compatibility between the materials.

Figure 2:
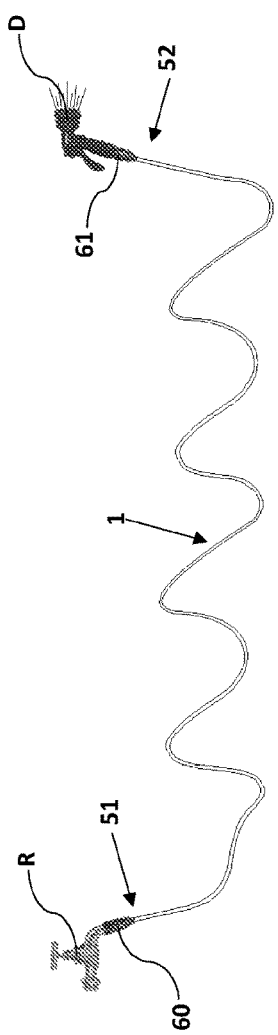
Figure 3:
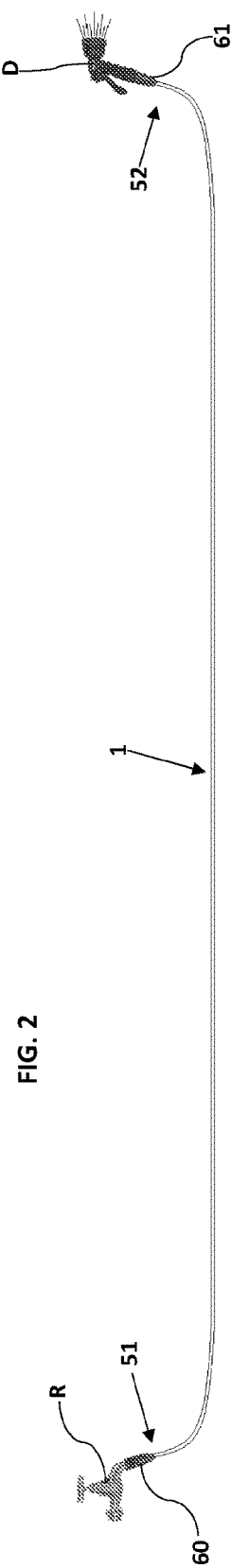

As particularly shown in FIGS. 1-3, at the ends 51, 52 of the hose 1 appropriate mutual union elements may be provided.

For example, respective couplers 60, 61 may be provided.

In a preferred but not exclusive embodiment, the coupler 60 may be e.g. a female coupler, and may be adapted to connect the hose 1 to a point of use, for example a tap R. On the other hand, the coupler 61 may be a male coupler, and may be adapted to connect the hose 1 to one or more sprinkler accessories D, for example a lance or a sprinkler.

In another embodiment, the end 52 of the hose 1 may be fixedly coupled to the sprinkler accessory D, for example a lance or a sprinkler. In this case, the hose 1 does not include the coupler 61, and cannot be coupled to more sprinkler accessories. At the other end 51 the coupler 60 may be provided for connecting the hose 1 to a point of use, for example a tap R.

Thanks to the above features, the extendable hose 1 may be susceptible to be automatically expanded by the working pressure imparted by the water that flows internally it, thus increasing its original length and diameter.

To do this, in a per se known manner, at least one restriction inside the hose or connected therewith may be provided.

In a preferred but not exclusively embodiment, in per se known manner, the at least one restriction may be defined by a flow restrictor located inside the coupler 61.

On the other hand, the hose 1 may internally include one or more restrictions, such as thickened portions or the like.

The at least one restriction may also be provided in the sprinkler accessory D, for example a lance or a sprinkler.

The at least one restriction may create a pressure drop such that the pressure upstream thereof acts internally to the hose 1, thus axially elongating it along the axis X and radially enlarging it perpendicularly to the same axis X.

In practice, once connected to the hose 1 to a point of use, for example to a tap R, upon the opening of the tap the water that passes through the hose 1 promotes the axial elongation and the radial enlarging thereof, as shown in FIGS. 2 and 3.

In other words, the water flow promotes the passage of the hose 1 from an original length and diameter (FIG. 1), that the same hose 1 has when no water passes through it, to a working length and the diameter (FIG. 3).

The transition from the original diameter and length to the working diameter and length occurs gradually, passing through an intermediate stage, shown in FIG. 2, in which the hose starts to enlarge and elongate under the thrust of the water pressure.

By contrast, upon the closing of the tap R the hose 1 automatically retracts, thus returning to its original length and diameter.

In order to achieve the above, the unitary tubular member 50 and the textile layers 30, 40 can cooperate with each other.

More precisely, the unitary tubular member 50 may have an elasticity such as to lengthen automatically under the working pressure imparted by the water and such as to retract automatically once the working pressure stops.

Moreover, thanks to its elasticity, under the working pressure the unitary tubular member 50 may radially enlarge to increase its original diameter and then automatically retract once the working pressure stops.

On the other hand, the elongation and the enlargement of the unitary tubular member 50 promotes the passage of the textile reinforcement layers 30, 40 from a rest configuration, shown in FIG. 4, which have when no water flows through the hose to a working configuration, shown in FIG. 5, which have under the working pressure.

Conversely, when the working pressure stops the automatic retraction of the unitary tubular member 50 returns the textile reinforcement layers 30, 40 in their rest configuration.

Under the working pressure, in addition to the increase in the length and diameter of the hose, a thinning of the whole thickness thereof further occurs. With the configuration and the materials shown above, the wall thickness under pressure decreases by about half.

Suitably, the first textile reinforcement layer 30 may be configured so as to intercept the unitary tubular member 50 upon its elongation so as to determine the maximum length.

Similarly, the second textile layer 40 may be configured so as to intercept the unitary tubular member 50 upon its enlargement or radial expansion in order to determine the maximum diameter.

To do this, the yarn of the textile reinforcement layers 30, 40 and the materials of the unitary tubular member 50 may be suitably selected, for example as described above.

Suitably, the second textile reinforcement layer 40 may be placed externally with respect to the first textile reinforcement layer 30.

In fact, because of its configuration the latter tends to restrain the axial elongation but to yield in the radial direction. By contrast, the second textile reinforcement layer 40 tends to restrain the radial enlargement but to yield in the axial direction. The cooperation of the two textile reinforcement layers 30, 40 allows to restrain the expansion of the hose in both axial and radial directions, thus determining the maximum length and diameter.

Alternatively to the knitted configuration, the first textile reinforcement layer 30 may be a weaving or knotting. FIGS. 8 and 9 show two examples of textile reinforcement woven layer, different each other for the orientation, the number and configuration of the yarns. FIG. 10 shows an example of a textile reinforcement knotted layer.

On the other hand, the second textile reinforcement layer 40 may consist of one or more spirals, in other words of one single spiral or by a braiding.

Suitably, the unitary tubular member 50 and the textile reinforcement layers 30, 40 may cooperate with each other so that under a working pressure of 2 bar the flexible hose 1 is susceptible to increase its length at least 1.5 times with respect to the its original length, preferably at least 2 times with respect to its original length and more preferably of at least 2.5 times with respect to its original length.

For example, with a hose having the structure described above and manufactured in the above materials, with an inner diameter at rest of 9 mm, outer diameter at rest of 14 mm and weight of 80 g/mt, the elongations at different Internal working pressures are provided in table 1 below.

TABLE 1

| Working pressure (bar) | Length under pressure:original length |
| --- | --- |
| 2 | 2 |
| 3 | 2.2 |
| 4 | 2.4 |
| 5 | 2.4 |
| 6 | 2.5 |

For such a hose, the radial expansion with respect to the diameter at rest at the working pressure of 3 bars is 0.8 mm, whereas at the working pressure of 5 bar is 1 mm.

It is understood that these data may change depending on the materials and/or the features of the hose, such as the inner or outer diameter or the weight/mt thereof.

Advantageously, the radial enlargement of the inner diameter of the hose of the present invention under a working pressure of 5 bar may be less than 20% with respect to the value of the inner diameter at rest, and preferably less than 15% with respect to the value of the inner diameter at rest.

In a preferred but not exclusive embodiment, the outer layer 20 may be a protective film which weight per meter may be 3% to 10% of the total weight of the unitary tubular member 50, for example 5% of the total weight of the unitary tubular member 50.

Preferably, the film 20 may be made in accordance with the teachings of the application PCT/IB2014/067091, which is referred to for proper consultation.

Indicatively, the film 20 may have a thickness of 0.05 mm to 0.4 mm, preferably 0.1 mm-0.3 mm.

This film 20 has the purpose of protecting the underlying layers, in particular the textile layers, and to give the appearance to the hose. It is also important for the resistance to external agents and the sliding of the hose on the ground.

In fact, it minimizes fouling of the hose as a result of the use on muddy grounds or in a garden.

Similarly, the intermediate layer 15 may also be a film having the same features of the outer film 20.

The extensible flexible hose 1 can be manufactured by means of a line 100, which works continuously.

The line 100 can be fed by the inner layer 10, which can for example be extruded through a first extruder 110 at the inlet 101 of the line 100.

In a per se known manner, the extruder 110 may coextrude the inner layer 10 and the detaching film 11, which may then pass through a first pair of faced rotating rollers 120 susceptible to press the hose.

Subsequently, the inner layer 10 and the detaching film 11 may pass through a first station 130 for making the textile reinforcement layer 30, so as to obtain a first semifinished product 25.

Advantageously, the station 130 may include a knitting machine 131, of a per se known type, to make the first textile knitted layer with knits of the tricot type 30, for example of the plain stich type.

Subsequently, the first semifinished product 25 may pass through a second pair of faced rotating rollers 121 susceptible to press the hose.

Advantageously, the rollers 121 may rotate faster than the roller 120. Advantageously, the ratio between the speed of the first upstream roller 120 and the one of the second downstream rollers 121 may be of 1:2 to 1:5, and more preferably of 1:3 to 1:5.

In this way, the two pairs of rollers 120, 121 continuously elongate the inner layer 10 with the inner film 11, so that the textile reinforcement layer 30 is made on the elongated inner layer 10.

Subsequently, the semifinished product 25 may pass through a second extruder 135, which extrudes a film constituting the above intermediate layer 15. Advantageously, in accordance with the teachings of the application PCT/IB2014/067091, the extrusion head 136 of the extrusion station 135 may be placed under vacuum by a vacuum pump 137, for example at a pressure of 250-400 mmHg.

The second semifinished product 25' at the outlet of the second extruder 135 passes through a third pair of faced rotating rollers 122 susceptible to press the hose. Advantageously, the rollers 122 may rotate at substantially the same speed of the rollers 121, or slightly higher.

In this way, the film 15 is extruded on the textile reinforcement layer 30 in the elongated working configuration.

Subsequently, the second semifinished product 25' at the outlet of the rollers 122 passes through a fourth pair of faced rotating rollers 123 susceptible to press the hose. Advantageously, the rollers 123 rotates more slowly than the roller 122.

Advantageously, the ratio between the speed of the fourth upstream rollers 123 and that of the third downstream rollers 122 may be of 2:1 to 5:1, and more preferably of 3:1 to 5:1.

In this way, the semifinished product 25' returns in a rest configuration, in which the layers 10, 11 and 15 have the original length and the textile reinforcement knitted layer 30 is in the rest configuration.

The semifinished product 25' in the rest configuration may be fed to a second station 140 for making thereon the textile reinforcement layer 40.

Advantageously, the station 140 may include a pair of spiraling machines 141, 142, to make a corresponding pair of spirals one in a clockwise direction and the other one in the opposite direction. The set of the two spirals constitutes the textile reinforcement layer 40.

The third semifinished product 25" at the outlet of the station 140 may then be fed to a third extruder 150, which may make the film 20. Similarly to what has been described for the second extruder 135, in accordance with the teachings of the application PCT/IB2014/067091, the extrusion head 151 may be placed under vacuum by a vacuum pump 152, for example at a pressure of 250-400 mmHg.

Upon extrusion, the inner layer 10, the intermediate film 15 and the outer film 20 adhere to each other in correspondence with the uncovered areas 13, 13' to form the unitary tubular member 50. In this way, the textile reinforcement layers 30, 40 remain embedded therein.

Thanks to the fact that the intermediate film 15 and the outer film 20 are made in accordance with the teachings of the application PCT/IB2014/067091, the same intermediate film 15 and the outer film 20 have a uniform thickness and adhere strongly to the underlying layer, as shown in FIG. 7.

This minimizes material waste and gives an optimum aesthetic finish to the hose 1.

The hose 1 thus produced may then pass through a fifth pair of faced rotating rollers 124 susceptible to press the hose.

Advantageously, the rollers 124 may rotate at substantially the same speed of the rollers 123, or slightly higher.

In this way, the second textile layer 40 and the film 20 are made on the semifinished products 25' and 25" in the rest configuration.

The detaching film 11 allows the detachment of the inner wall of the hose 1 after pressing immediately upon passage through the rollers 120, 121, 122, 123 and 124.

In a preferred but not exclusive embodiment, the second textile layer 40 and the film 20 can also be made on the semifinished product 25' in the elongated configuration. To do this, the rollers downstream the station 140 and the extruder 150 rotate faster than the ones upstream thereof, preferably in the above ratios.

In this case, the inner diameter of the elongated semifinished product 25' may preferably be brought to the inner diameter of the hose at rest by blowing air at adequate pressure.

To do this, suitable means may be provided for blowing air, of a per se known type, at the outlet 102 of the line 100.

Advantageously, the rollers 120, 121, 122, 123 and 124 may be mutually configured so that the air blown at the outlet 102 goes back up through the hose in correspondence of the rollers 121.

It is understood that in the line 100 in place of the rollers 120, 121, 122, 123 and 124 any rotary conveying device may be employed without departing from the scope of the appended claims.

From the above description, it is apparent that the invention fulfils the intended objects.

The invention is susceptible of numerous modifications and variations, all falling within the inventive concept expressed in the attached claims. All the details may be replaced with other technically equivalent elements, and the materials may be different according to requirements, without departing from the scope of the invention.

Although the invention has been described with particular reference to the attached figures, reference numbers used in the description and in the claims are used to improve the intelligence of the invention and do not constitute any limitation of the claimed scope.

The invention claimed is:

1. An extensible flexible hose for transporting liquids, particularly water, comprising:

at least one inner layer made of a first elastic polymeric material;

at least one outer layer made of a second elastic polymeric material;

at least one textile reinforcement layer interposed between said at least one inner layer and at least one outer layer;

wherein said at least one inner layer and said at least one outer layer are reciprocally coupled to form a unitary tubular member, said at least one textile reinforcement layer being embedded therein;

wherein said unitary tubular member has an elasticity that causes said unitary tubular member to automatically elongate and enlarge upon a working pressure given by a liquid flowing therethrough to respectively increase an original length and diameter of said unitary tubular member and to automatically recover once the working pressure stops for assuming again said original length and diameter;

wherein said at least one textile reinforcement layer is adapted to move between a rest configuration that is present when no liquid flows through the unitary tubular member and a working configuration that is present when said unitary tubular member elongates and enlarges under the working pressure; and wherein said first and said second elastic polymeric materials are elastomers or thermoplastic elastomers, said unitary tubular member having a Shore A hardness measured according to ASTM D2240 of 30 ShA to 50 ShA.

2. The hose according to claim 1, wherein the automatic elongation and enlargement of said unitary tubular member (50) promotes a moving of said at least one textile layer (30, 40) from the rest configuration to the working configuration, the automatic recovery of said unitary tubular member promoting a retreat of said at least one textile layer from the working configuration to the rest configuration.

3. The hose according to claim 1, wherein said at least one textile reinforcement layer and said unitary tubular member are reciprocally configured so that said at least one textile reinforcement layer restrains said unitary tubular member upon an elongation and enlargement of said unitary tubular member so as to define a maximum length and diameter thereof.

4. The hose according to claim 1, wherein said at least one textile reinforcement layer is disposed on an outer surface of said at least one inner layer so as to leave thereon a plurality of uncovered areas, said at least one outer layer and at least one inner layer being reciprocally coupled in correspondence of said uncovered areas.

5. The hose according to claim 1, wherein said unitary tubular member has the original diameter and the original length when said at least one textile reinforcement layer is in the rest configuration, said unitary tubular member being enlarged and elongated when said at least one textile reinforcement layer is in the working configuration.

6. The hose according to claim 5, wherein said at least one textile reinforcement layer comprises at least one first textile reinforcement layer and at least one second textile reinforcement layer, said at least one first textile reinforcement layer and said unitary tubular member being reciprocally configured so that the at least one first textile reinforcement layer restrains the unitary tubular member upon an elongation of the unitary tubular member so as to define the maximum length, said at least one second textile reinforcement layer and said unitary tubular member being reciprocally configured so that the at least one second textile reinforcement layer restrains the unitary tubular member upon an enlargement of the unitary tubular member so as to define the maximum diameter.

7. The hose according to claim 6, wherein said second textile reinforcement layer is externally placed with respect to said first textile reinforcement layer, said at least one first textile reinforcement layer being in a form selected among the group consisting of knitting, weaving or knotting, said at least one second textile reinforcement layer being a spiral or a braiding.

8. The hose according to claim 1, wherein said unitary tubular member and said at least one textile reinforcement layer cooperate each other so that under a working pressure of 2 bar the hose increases its length of at least 1.5 times with respect to its original length.

9. The hose according to claim 1, wherein said unitary tubular member once elongated and enlarged by the working pressure recovers back to its original length exclusively thanks to its elasticity, without any other biasing means.

10. The hose according to claim 1, further comprising at least one restriction or at least one flow restrictor to create within the hose the working pressure adapted to promote an elongation and an enlargement of the hose, said at least one restriction or at least one flow restrictor being internal to the hose or connected therewith.

* * * * *